(No Model.)
W. E. GATEWOOD.
METALLIC WHEEL.
No. 372,370. Patented Nov. 1, 1887.
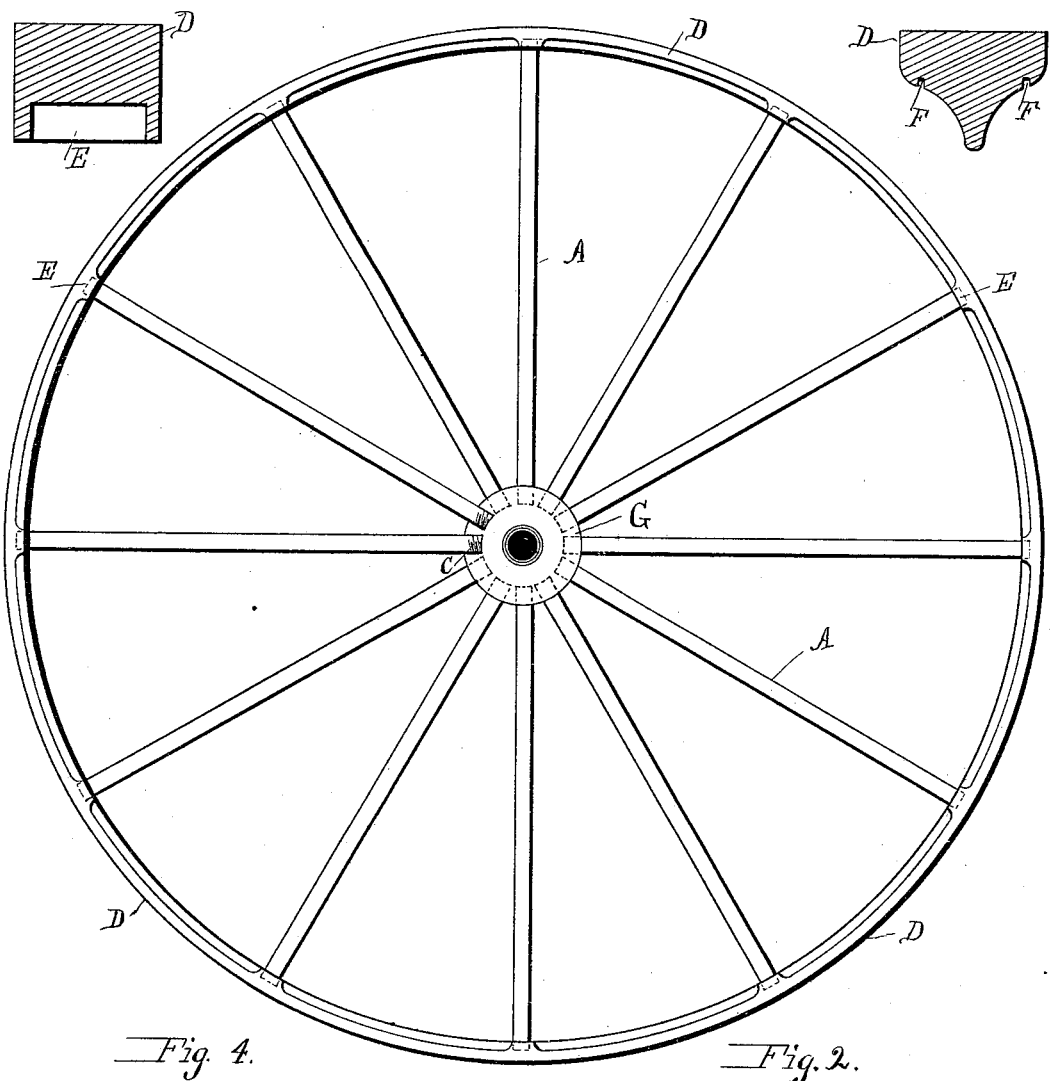
Witnesses:
R. A. Balderson.
J. A. Killigan.
Inventor:
W. Emmet Gatewood
By L. Bingham
His Attorney.

UNITED STATES PATENT OFFICE.

WESLEY EMMET GATEWOOD, OF STOCKPORT, OHIO.

METALLIC WHEEL.

SPECIFICATION forming part of Letters Patent No. 372,370, dated November 1, 1887.

Application filed April 6, 1887. Serial No. 233,914. (No model.)

*To all whom it may concern:*

Be it known that I, WESLEY EMMET GATEWOOD, a citizen of the United States of America, residing at Stockport, in the county of Morgan and State of Ohio, have invented certain new and useful Improvements in Metallic Wheels, of which the following is a specification, reference being had therein to the accompanying drawings.

My invention relates to metallic wheels; and its objects are, first, to provide for the ready conjunction and disjunction of the parts; second, to permit the facile renewal of worn parts; third, to combine the parts according to the use required, and, fourth, to attain these ends with structural simplicity and economy. I accomplish these aims by the devices illustrated in the accompanying drawings, in which—

Figure 1 represents an elevation of a wheel embodying the essential features of my invention. Fig. 2 represents the felly having a series of spoke-sockets adapted to a light wagon. Fig. 3 represents the felly having a series of spoke-sockets adapted to a heavy wagon. Fig. 4 shows the construction of the spokes. Fig. 5 is a transverse section on the line $xx$ of Fig. 3, and Fig. 6 is a transverse section on the line $yy$ of Fig. 2.

The same designations indicate corresponding parts in all the views.

The spokes A of the wheel are uniformly threaded at C on their inner termini to the extent of one-half the depth of their respective sockets in the hub G, whereby undue strain is obviated. Their outer termini are uniformly smooth and fit either into the series of felly-sockets F, adapted to a light wagon, or the felly-sockets E, adapted to a heavy wagon. The spokes A are tubular, except near their outer ends, where plugs B are inserted to limit the depth to which the spokes shall be inserted in the felly D, thus incidentally securing a firm and stable joinder of the parts. The felly D, the hub G, and the spokes A are all metallic, whereby the clinging of mud is measurably prevented, and the entire wheel is consequently light, durable, and capable of a ready renewal of the parts.

It will be understood that in the construction of wheels according to my invention I take a hub, G, having uniform radial sockets whose lower halves are threaded to correspond with the threads C on the inner termini of the spokes A. The outer ends of the spokes having been inserted either in the series of sockets E or F in the felly D, their inner ends are then screwed into the hub, thus rigidly securing the parts. The tire and felly in this invention are identical.

Heretofore a metallic wheel has been shown in which sectional spokes are employed, which are held by tenons in the hollow felly, the felly being adapted to be tightened by a square nut engaging a right and left hand screw attached to the adjacent ends of said felly, whereby the spokes are held, as desired. A concave tire embraces the felly. Also, a metallic wheel has been devised in which the spokes have left and right handed threads at their respective ends, whereby they are screwed into the hub and felley, the felly being semicircular on its outer face to accommodate a rubber tire. Also, a metallic wheel has been exhibited in which a tubular hub is provided with a series of radial hollow cylindrical sleeves, whose outer ends screw into the hub and whose inner ends are threaded to engage the right threaded ends of the spokes, the left threaded ends thereof screwing into the felly, assisted by strengthening-plates.

My invention combines a tire and felly, thus dispensing with the former. Neither do I use cylindrical sleeves or strengthening-plates to hold the spokes or their equivalents. Thus I accomplish with a less number of parts the same ends that heretofore required a greater number.

Having thus fully described my invention, what I claim, and desire to secure by Letters Patent of the United States, is—

The felly D, also constituting the tire, having sockets E F, adapted for use in alternate series, in combination with the tubular spokes A, smooth at one end and threaded at the other, being provided with plugs B to limit their insertion in the felly, and the hub G, having radial sockets correspondingly threaded to engage the inner termini of said spokes, as herein fully shown and described.

In testimony whereof I affix my signature in presence of two witnesses.

WESLEY EMMET GATEWOOD.

Witnesses:
C. H. HARRIS,
J. M. GATEWOOD.